T. F. EVANS.
DRIVING GEAR FOR MOTOR VEHICLES.
APPLICATION FILED MAR. 20, 1909.
1,105,640.
Patented Aug. 4, 1914.
4 SHEETS—SHEET 3.
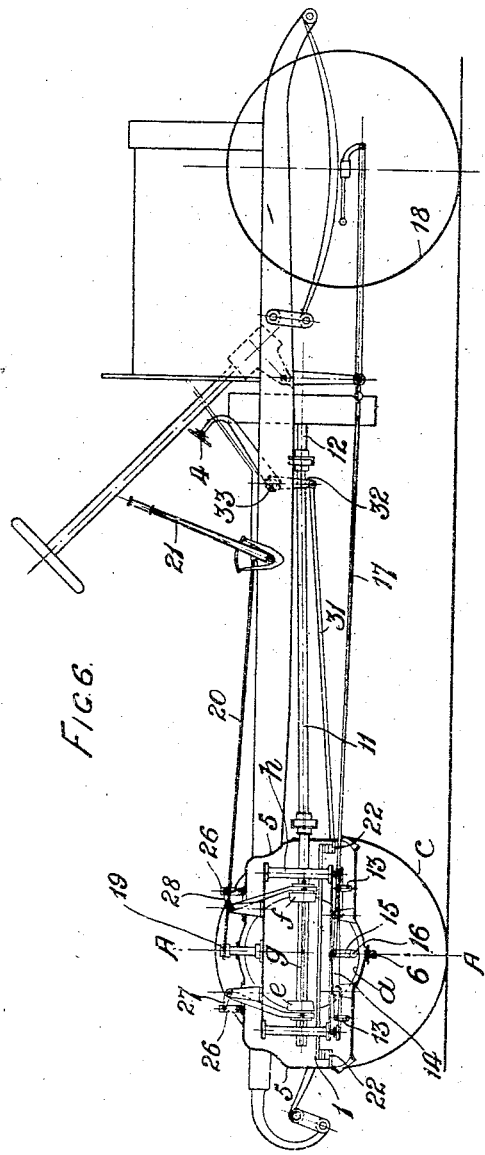
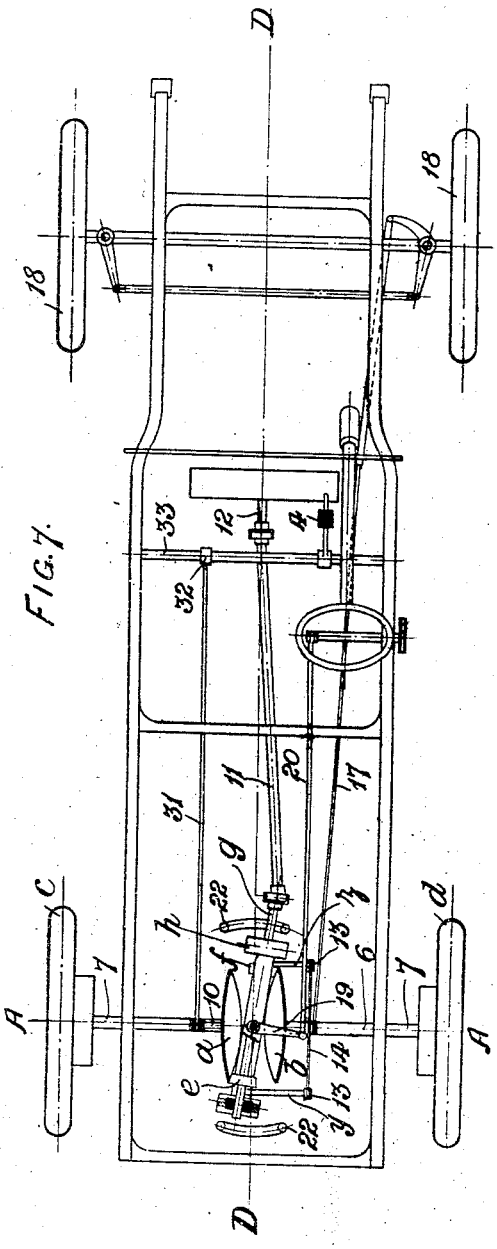

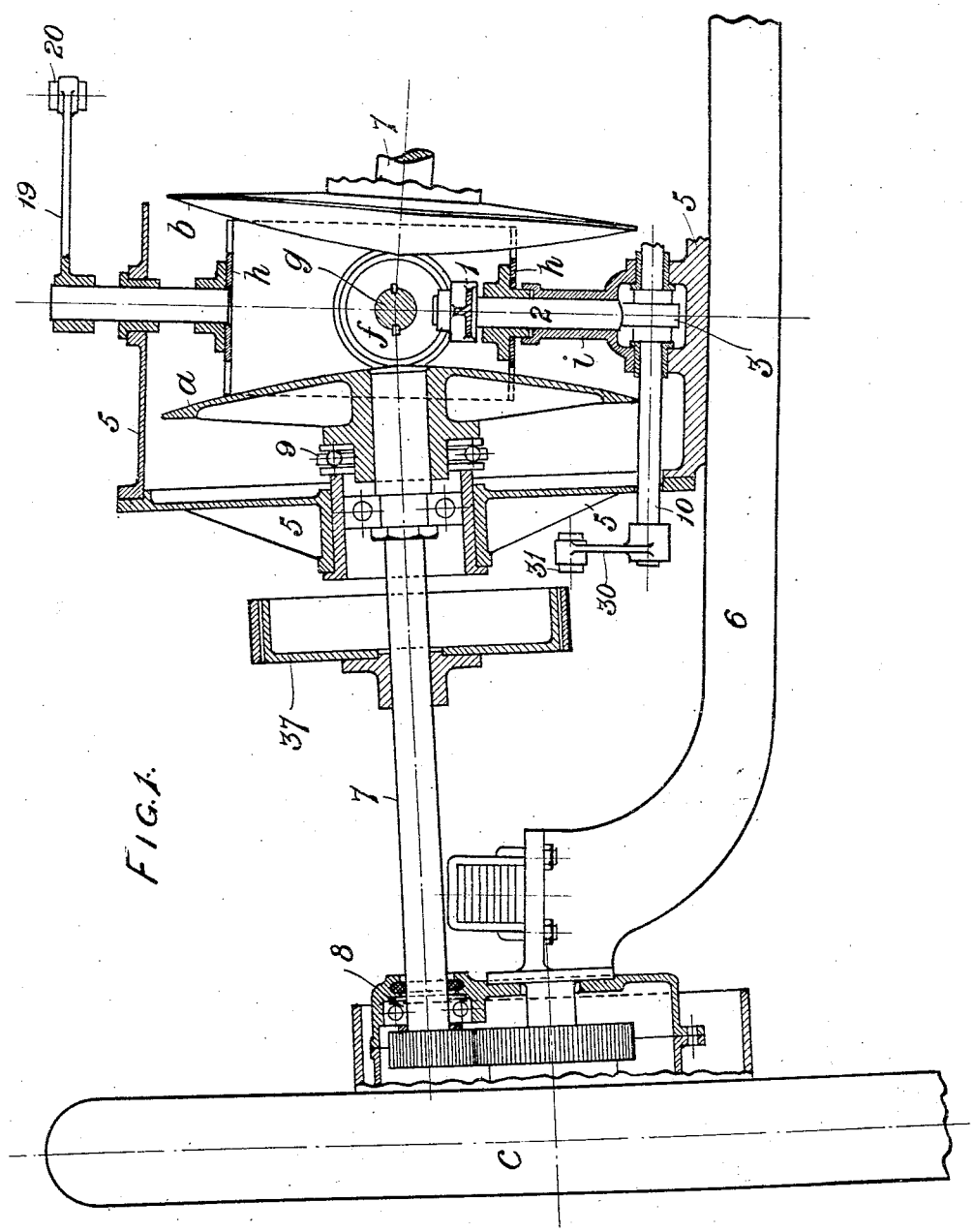

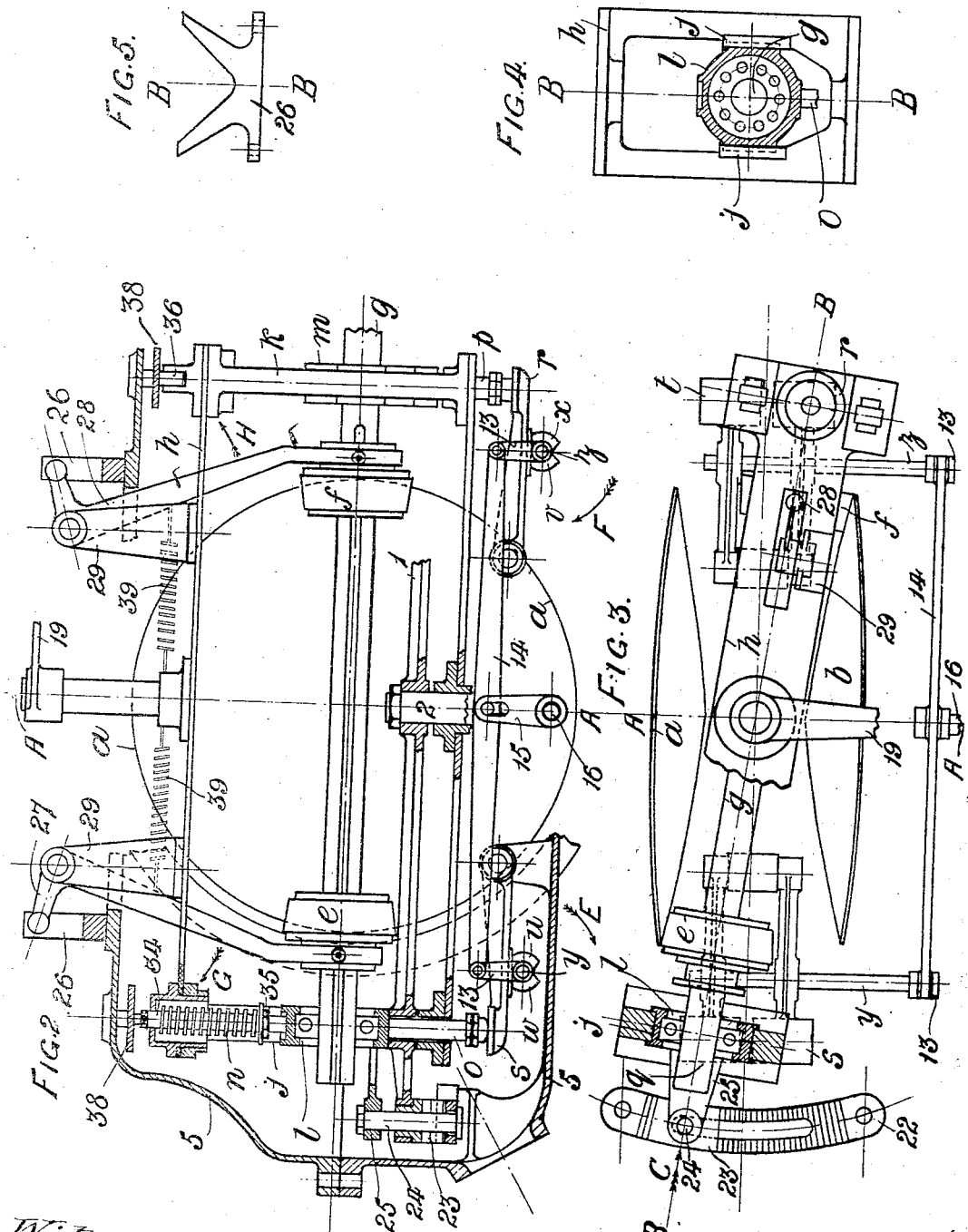

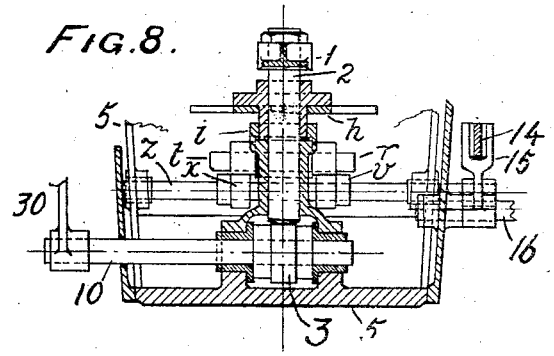

UNITED STATES PATENT OFFICE.

THOMAS FRANCIS EVANS, OF WILMSLOW, ENGLAND.

DRIVING-GEAR FOR MOTOR-VEHICLES.

1,105,640.  Specification of Letters Patent.  Patented Aug. 4, 1914.

Application filed March 20, 1909. Serial No. 484,724.

*To all whom it may concern:*

Be it known that I, THOMAS FRANCIS EVANS, engineer, a subject of the King of the United Kingdom of Great Britain and Ireland, and resident of Cedar Bank, Knutsford Road, Wilmslow, in the county of Chester, England, have invented new and useful Improvements in Driving-Gears for Motor-Vehicles, of which the following is a specification.

The objects of this invention are to provide more efficient, trustworthy and convenient friction gearing and auxiliary mechanism for transmitting motion to the driving wheels of motor-driven vehicles from motors used to drive them and enabling the speeds of the driving wheels to be adjusted relatively to those of the motors, than have hitherto been provided and to enable such gearing to be applied in motor-driven vehicles and manipulated in use with greater convenience and advantage than has been possible with the forms of such gearing hitherto provided and the mechanism provided for the manipulation thereof.

The objects and advantages proposed to be accomplished and obtained by the application of the said improvements will be made more fully apparent in the description following.

In the accompanying drawings a form of friction-gearing and auxiliary mechanism provided in accordance with this invention and the application thereof to a motor-driven vehicle are shown by way of example in illustration of this invention and the manner of carrying it into effect.

In the said drawings throughout which the same letters of reference are employed to indicate corresponding parts, Figure 1 is a partial transverse section taken on the plane indicated by the line A—A of Figs. 2, 3, 6 and 7, Fig. 2 is a partial vertical section on the plane indicated by the line B—B of Fig. 3. Fig. 3 is a partial plan. Figs. 4 and 5 are end elevations of certain parts shown detached and seen in the direction indicated by the arrow C of Fig. 3, Fig. 6 is in part a diagrammatic side elevation and in part a diagrammatic section taken on the plane indicated by the line D—D of Fig. 7, and Fig. 7 is a diagrammatic partial plan. Fig. 8 is a partial section taken on the plane indicated by the line A—A of Fig. 2, showing some of the cams employed and the parts carrying them more fully than is possible without confusion in Fig. 1. Fig. 9 is partly a longitudinal section through the center of the apparatus and partly a side elevation showing the cams and some of the tappets employed. Fig. 10 is a plan showing the cams and tappets, two of the tappets being shown broken in order that the cams beneath them may be better shown.

In every figure certain parts indicated elsewhere are omitted for greater clearness of illustration of other parts.

$a\ b$ are friction disks to be connected to the driving wheels $c\ d$ at opposite sides of a motor-driven vehicle.

$e\ f$ are rollers situate at opposite sides of the axes of the disks $a\ b$ and provided to be brought alternately into engagement with one or other of the friction disks $a\ b$.

The rollers $e\ f$ are, according to this invention, mounted to turn with and to be capable of being moved in opposite directions lengthwise of a shaft $g$ which is shown as having grooves to receive keys or feathers provided in the rollers $e\ f$ and as fitted to revolve and to slide endwise in bearings in blocks $l\ m$ mounted to slide in vertical guides $j\ k$ provided upon a frame $h$ which is mounted to turn through an arc on a tubular guide $i$ carried by a casing 5, inclosing the friction disks $a\ b$, the rollers $e\ f$ and some parts of the devices used with them. In the case illustrated the shaft $g$ extending through the one end of the casing 5, is connected in any suitable way as for instance, by means of a shaft 11 which, though shown diagrammatically as a solid shaft, is preferably a telescopic shaft as ordinarily used in motor-driven vehicles and is connected by means of a universal joint to a suitable part, as for example, a shaft 12 of the motive agent, so that both rollers $e\ f$ revolve together always in one direction and by being made to bear against the disks $a\ b$ respectively or against the disks $b\ a$ respectively will cause them to revolve in one direction or in the opposite direction.

According to this invention the disks $a\ b$ are made to afford a space widening in a direction transverse both to the axes of the disks and to the axis of the rollers $e\ f$ from a part of least width for the play of the rollers to drive them. This widening may be obtained and be directed in any suitable way but in the case illustrated is directed upward and obtained by the disks $a\ b$ being also according to this invention canted or inclined so as to be farther apart above than below and as is clearly indicated in the drawings, made increasingly, that is to say, more acutely, conical from the central parts toward the edges. The frame $h$ is capable of being turned about the tubular guide $i$ into position either to bring the rollers $e\ f$ against the disks $a\ b$ respectively or to bring the rollers $e\ f$ against the disks $b\ a$ respectively, the shaft $g$ sliding in the rollers $e\ f$ and the blocks $l\ m$ in the movement. Springs $n$ are provided to press in the directions of the guides $j\ k$ down upon the blocks $l\ m$ and so to keep the rollers $e\ f$ in proper contact with the friction disks $a\ b$ while at work and to prevent wear from interfering with the action of the friction gearing.

The springs $n$ and the slight play inevitable or easily allowable in the fitting of the parts of the mechanism to work together and especially in the fitting of the blocks $l\ m$ in the guides $j\ k$, also allow the rollers $e\ f$ to be raised separately or together by the shaft $g$ being tilted about one or other of two parts, that is to say, about the parts respectively bearing in the blocks $l\ m$ or being moved up and down as a whole, the raising of either roller $e$ or $f$ being in either case transverse to the movements in which it is moved radially to either of the disks $a\ b$ or from one of such disks to the other.

Within the limits determined by the form and canting of the disks $a\ b$, any upward or downward movement of either roller $e$ or $f$ although it is simply a vertical movement will take it away from or bring it nearer to the disks $a\ b$ and thus the farther either roller $e$ or $f$ is pressed down toward approximately the position in which its axis is most nearly radial to the axis of the disk $a$ or $b$ against which it bears, the more strongly will it bear against such disk.

The rollers $e\ f$ being pressed against the friction disks $a\ b$ while in action tend to be moved upward and so the disks $a\ b$ and rollers $e\ f$ serve to press upward and so to support wholly or in part the frame $h$ and the several parts carried by it and enable the weight of these parts to be utilized in securing efficient driving contact of the rollers $e\ f$ against the disks $a\ b$, the upward movement of the frame $h$ being, as will hereinafter be further explained, limited by means of the casing 5.

The increasingly or more acutely conical form given to the disks $a\ b$ toward the edges has important advantages in comparison with the use of plane inclined disks or merely conical disks whether inclined or not. One of these advantages of the increasingly or more acutely conical form given to the disks toward the edges is that it enables true rolling contact or an approximation as close as desirable to true rolling contact between the rollers $e\ f$ and the disks to be obtained at the outer parts of the disks $a\ b$ where most necessary as well as making possible efficient contact throughout the parts by which they transmit motion by friction. Another of these advantages of the increasingly or more acutely conical form given to the disks $a\ b$ toward the edges is that it enables the radial movement of the rollers $e\ f$ relative to the disks $a\ b$ to be effected along with the movement of the rollers toward and from the disks $a\ b$ as will more clearly appear later in this description. The rollers $e\ f$ are preferably of a conical form fitting them to roll in approximately true rolling contact against the outer parts of the disks $a\ b$. The casing 5 is secured by means of bolts and a plate to the rear axle 6 and is provided with bearings to support the inner ends of shafts 7 on which the friction disks $a\ b$ are mounted. At their outer ends the shafts 7 are mounted in bearings 8 carried in any suitable way by the axle 6, as for example by means of parts of dust-excluding cases, and are provided with toothed wheels in gear with toothed wheels fast with the driving wheels $c\ d$. If, as in the case illustrated in the drawings, the friction disks be parallel to the driving wheels $c\ d$ respectively, the connection between them may be easily made by, for example, spur gearing or chains and if the disks $a\ b$ be not parallel to the driving wheels, as, for example, by the driving wheels not being canted, bevel wheels of slight or very moderate taper will serve or other suitable gearing or jointed transmission devices may serve. Each of the shafts 7 is furnished with a ball-thrust-bearing 9 to support the friction disk $a$ or $b$ mounted upon it against the lateral pressure of the rollers $e\ f$.

In order that the frame $h$ may be moved about the center line of the guide $i$ bring the rollers $e\ f$ into contact with the disks $a\ b$ respectively or into contact with the disks $b\ a$ respectively, and, in the case illustrated, also to effect the movement of the rollers $e\ f$ radially relatively to the disks $a\ b$ in order to adjust the speed of the disks $a\ b$ relatively to the speed of the rollers $e\ f$ and the motor, an arm 19 is secured to the frame $h$ and connected by a rod 20 to an arm fast upon a shaft provided with a lever 21 mounted in a position convenient for operation by the driver.

In order that the shaft $g$ may be tilted about the part bearing in the block $l$ or the part bearing in the block $m$, rods $o\ p$ mounted to be slid up and down in the frame $h$ are connected at their upper ends to the blocks $l\ m$ respectively and their lower ends are brought respectively over tappets $q\ r$ or over tappets $s\ t$ according as the frame $h$ is turned into position to bring the rollers $e\ f$ against the disks $a\ b$ respectively or into position to bring the rollers $e\ f$ against the disks $b$ $a$ respectively. The tappets $q$ $r$ $s$ $t$ are shown in Figs. 2 and 6 as mounted upon pivots in brackets or supports provided on the interior of the casing 5 and cams $u$ $v$ $w$ $x$ in the form approximately of sectors of rings are mounted beneath the tappets $q$ $r$ $s$ $t$ respectively so as when turned in proper directions to raise such tappets $q$ $r$ $s$ $t$ respectively from the position in which they are indicated or to allow them to return to that position after being raised. The cams $u$ $x$ are similar to and directed oppositely to the cams $w$ $v$ respectively. The cams $u$ $w$ are mounted fast on a shaft $y$ capable of being oscillated in bearings screwed or otherwise secured in the casing 5 and the cams $v$ $x$ are mounted fast on a shaft $z$ also capable of being oscillated in the casing 5 and arms 13 fast upon the shafts $y$ $z$ are connected to a rod 14 and thereby connected together and to an arm 15 which is furnished with a slot to receive a stud fixed in the rod 14 and is carried by a shaft 16 mounted in a bearing in one side of the casing 5 and a rod 17 connected at one end to the arm 15 is connected to a convenient part of the steering mechanism of the motor driven vehicle so that the shafts $y$ $z$ shall be turned respectively in the directions indicated by the arrows E F when the steering wheels 18 are turned to guide the vehicle to the right hand whether forward or backward and shall be turned respectively in the directions opposite to those indicated by the arrows E F when the steering wheels 18 are turned to guide the vehicle to the lefthand whether forward or backward.

When the shafts $y$ $z$ are turned respectively in the directions indicated by the arrows E F from the position in which they are indicated, the cams $w$ $v$ being raised from the position in which they are indicated will raise the tappets $s$ $r$ respectively, while the cams $w$ $x$, being lowered from the position in which they are indicated will leave the tappets $q$ $t$ unaffected and when the shafts $y$ $z$ are turned respectively in the directions opposite to those indicated by the arrows E F the cams $u$ $x$ being raised from the position in which they are indicated will raise the tappets $q$ $t$ and the cams $v$ $w$ being lowered from the positions in which they are indicated will leave the tappets $r$ $s$ unaffected. If therefore the rollers $e$ $f$ be against the disks $a$ $b$ respectively and consequently the rods $o$ $p$ are over the tappets $q$ $r$ respectively movement of the steering wheels 18 to guide the vehicle to the right hand will be accompanied by turning of the shafts $y$ $z$ in the directions indicated by the arrows E F respectively and raising of the tappet $r$ by the cam $v$ with the effect of raising the rod $p$ and block $m$ and disengaging the roller $f$ from the disk $b$ and movement of the steering wheels 18 to guide the vehicle to the left hand will be accompanied by turning of the shafts $y$ $z$ respectively in the directions opposite to those indicated by the arrows E F and the raising of the tappet $q$ by the cam $u$ with the effect of raising the rod $o$ and block $l$ and disengaging the roller $e$ from the disk $a$. If however the rollers $e$ $f$ be against the disks $b$ $a$ respectively and consequently the rods $o$ $p$ are over the tappets $s$ $t$ respectively, movement of the steering wheels 18 to guide the vehicle to the right hand will be accompanied by turning of the shafts $y$ $z$ respectively in the directions indicated by the arrows E F and the raising of the tappet $s$ by the cam $w$ with the effect of raising the rod $o$ and block $l$ and disengaging the roller $e$ from the disk $b$ and movement of the steering wheels 18 to guide the vehicle to the left hand will be accompanied by turning of the shafts $y$ $z$ respectively in the directions opposite to those indicated by the arrows E F and the raising of the tappet $t$ by the cam $x$ with the effect of raising the rod $p$ and the block $m$ and disengaging the roller $f$ from the friction disk $a$. In this way the same driving wheel is enabled to be disengaged from the motive agent for the more easy turning of a corner, whenever the steering wheels are turned to guide the vehicle around a corner on the same hand whether it be driven forward or backward.

In order that the shaft $g$ may be moved up and down as a whole, as shown in Figs. 1, 2 and 6, a rod 1 embracing both of the rods $o$ $p$ and made to lie beneath the two blocks $l$ $m$ is connected to a rod 2 mounted to turn slightly in the guide $i$ over a cam 3 fast upon a shaft 10 mounted in bearings in the casing 5 so that by the turning of the cam 3, the rod 2 may be raised and lowered in order to raise and lower both blocks $l$ $m$ and the shaft $g$ so as to bring both of the driving wheels $c$ $d$ out of or into connection with the motor. The cam 3 is shown as worked by means of a pedal 4 which therefore serves instead of the pedal ordinarily provided in a motor-driven vehicle for control of the connection and disconnection of the motor with and from the driving wheels and when desirable to allow the driving wheels to "run free."

Means are provided by which the frame $h$ may be held firmly in the various positions into which it may be moved from time to time and for this purpose, in the case illustrated, the casing 5 is furnished with slotted curved guides 22 with teeth upon the upper surface to be engaged by dogs 23 secured in the ends of the rod 1 so as to be raised and lowered therewith.

The dogs 23 closely surround rods 24 secured in the brackets 25 firmly secured to the frame $h$ so that the dogs 23 when engaged in the teeth of the guides 22 form fixtures for the rods 24 and enable the frame $h$ to resist the pressure between the disks $a$ $b$ and the rollers $e$ $f$ due to the inclination of the disks $a$ $b$ and to the springs $n$ and to the weight of the parts pressing the rollers $e$ $f$ against the disks $a$ $b$ while the rods 24 passing through the curved slots of the guides 22 and being furnished with heads also serve to limit the upward movement of the frame $h$ in the adjustment of the springs $n$ before the upper part of the case 5 is placed in position.

If the rod 1, being raised to disengage the rollers $e$ $f$ from the disks $a$ $b$, be raised sufficiently, the dogs 23 will be disengaged from the guides 22 and the frame $h$ will be set free to be moved and to be secured by the dogs 23 being lowered again in any other position permitted by the formation of the teeth on the dogs 23 and in the guides 22 and the positions of the notches or other like means, if any, of securing the lever 21 provided in the sector used with such lever 21 and thus the angular position of the shaft $g$ between the disks $a$ $b$ may be easily adjusted.

The upward and downward movement of the blocks $l$ $m$ in the frame $h$ effected by means of the cams $u$ $v$ $w$ $x$ does not affect the dogs 23.

The casing 5 is furnished with guide brackets 26 one of which is shown detached in Fig. 5, which are placed transversely upon it and provided with surfaces inclined upward from the center toward each side to act in the movement of the frame $h$ from its central position toward either limit of the movement permitted to it, upon bell-crank levers 27, 28, carried by studs in brackets 29 secured to the frame $h$. The bell-crank levers 27, 28, are provided with short arms to be pressed against the inclined surfaces of the brackets 26 respectively and with long forked and slotted ends engaging the trunnions of collars mounted in grooves surrounding the bosses of the rollers $e$ $f$. In the movement of the frame $h$ from its central position toward either limit of the movement permitted to it the bell-crank levers 27, 28, will be turned respectively in the directions indicated by the arrows G H so as to move the rollers $e$ $f$ away from the axes of the disks $a$ $b$ while the movement of the frame $h$ toward its central position will allow springs 39 connected to the levers 27, 28, to turn them respectively in directions opposite to those indicated by the arrows G H and cause them to move the rollers $e$ $f$ toward the axes of the disks $a$ $b$. For every position of engagement of the dogs 23 with the guides 22, there is thus a corresponding position of each of the rollers $e$ $f$ relatively to the disk $a$ or $b$ with which it may be in contact.

Movement of the lever 21 enables the ratio of the speed of the driving wheels $c$ $d$ to that of the motor to be adjusted very conveniently and easily, the movement of the rollers $e$ $f$ radially in relation to the disks $a$ $b$ being made easily, because it is only possible for it to be made when the rollers $e$ $f$ have been moved out of engagement with the disks $a$ $b$ by means of the movement of the pedal 4 to disengage the dogs 23 from the guides 22. The pedal 4 is connected to the shaft 10 by means of arms 30 and 32 (which are respectively fast on such shaft 10 and a shaft 33 carrying the pedal 4 and mounted to be oscillated in the frame of the motor driven vehicle) and a rod 31 jointed to the arms 30 and 32.

Any other well known or approved means of working or controlling the radial movement and the lateral movement of the rollers relatively to the friction disks may be employed when desirable instead of that illustrated in the accompanying drawings and hereinbefore described.

The bell-crank levers 27, 28, must necessarily be so made and worked that when moved they shall move the rollers $e$ $f$ to approximately the same extent in either direction.

The springs $n$ provided to press the blocks $l$ $m$ downward in the guides $j$ $k$ are made to surround rods 34 which are inserted and project and are movable at their upper ends in and through sockets provided in the frame $h$ and bear at their lower ends in the blocks $l$ $m$ and nuts 35, screwed upon the rods 34, enable the springs $n$ to be compressed to bear as strongly as may be requisite against washers resting on the nuts 35 and against the interiors of the sockets in the frame $h$.

The blocks $l$ $m$ are shown as provided with ball-bearings to carry the shaft $g$.

As hereinbefore mentioned, the casing 5 serves to limit the upward movement of the frame $h$ by upward pressure due to the action of the rollers $e$ $f$ against the disk $a$ $b$. Rollers 36 are provided in the ends of the upper parts of the box or frame $h$ to bear against plates 38 secured in the casing 5. The rollers 36 facilitate the movement of the frame $h$ requisite to move the rollers $e$ $f$ between the disks $a$ $b$ by preventing the upward pressure of the springs $n$ from causing the box or frame $h$ to bind or bear excessively against the casing 5. The casing 5 also serves to exclude dust from the mechanism within it.

In order to facilitate the adjustment of the rods $o$ $p$ relatively to the tappets $q$ $r$ $s$ $t$ each of the rods $o$ $p$ is formed in two parts screwed one into the other and secured in relative position by lock nuts.

The shaft 7 may, as is indicated in the case of one of such shafts in Fig. 1, carry brake drums to receive contact of band brakes constituting one set of the brakes provided in the machine. 37 is one of such brake drums.

Other parts indicated in the accompanying drawings and not already mentioned herein will be understood without further description and the construction of other parts necessary to a motor-driven vehicle but not forming parts of this invention and so not indicated in the accompanying drawings can be readily supplied without description herein.

The foregoing description suffices to make clear that the canting or inclination of the axes of the friction disks connected to the driving wheels enables very great advantages to be obtained in the engagement and disengagement of the rollers, and I would have it understood that I claim broadly as part of my invention the application of friction disks whatever their form, canted relatively to one another as means of receiving motion from rollers and conveying it to driving wheels.

The disks $a\ b$ being canted or inclined so as to be farther apart above than below, any upward or downward movement of the rollers $e\ f$ will cause a greater decrease or increase of their pressure against the disks $a\ b$ or $b\ a$ than it would if the axes of the disks were horizontal so that disengagement and engagement can be effected by quite small upward and downward movements of the rollers $a\ b$ and the connection to driving wheels canted in the manner now considered advantageous is facilitated.

From the foregoing description of the mechanism illustrated in the accompanying drawings, it is apparent that the several devices provided according to this invention, as means of tilting the shaft carrying the rollers $e\ f$ about one or the other of two parts, as means of raising such shaft and lowering it, as means of turning such shaft to bring either of the rollers $e\ f$ against either of the disks $a\ b$, as means of adjusting the position of the rollers $e\ f$ relatively to the friction disks $a\ b$ and as means of locking the box or frame $h$ in different positions are very simple convenient and efficient in construction, manipulation and use.

It will be understood that for the sake of simplicity in the foregoing description, the words "transverse" "radial" and "vertical" have been used not only in strictly accurate application but also in description of directions of movement and positions of parts which are only more or less approximately transverse or radial to others or vertical as the case may be.

When desirable, mechanism provided according to this invention may be applied to motor-driven vehicles already constructed.

What I claim is:

1. In a transmission mechanism for a motor-driven vehicle, driving wheels, two friction disks respectively in connection with the driving wheels affording between them a space tapering in a direction transverse to the axes of the disks, rollers to drive such friction disks, means for moving the rollers toward and away from central parts of the disks, means for moving the rollers from one disk to the other and means for moving either roller transversely both to the direction of movement toward and away from the central parts of the disks and to the direction of movement from one disk to the other.

2. In a transmission mechanism for a motor-driven vehicle, driving wheels, two friction disks respectively in connection with the driving wheels affording between them a space tapering in a direction transverse to the axes of the disks, rollers for driving the friction disks, means for moving the rollers toward and away from central parts of the disks, means for moving the rollers from one disk to the other, and means for moving both of the rollers at once transversely both to the direction of movement toward and away from central parts of the disks and to the direction of movement from one disk to the other.

3. In a transmission mechanism for a motor-driven vehicle, driving wheels, two friction disks respectively in connection with the driving wheels affording between them a space tapering in a direction transverse to the axes of the disks, rollers for driving the friction disks, means for moving the rollers toward and away from central parts of the disks, means for moving the rollers from one disk to the other, means for moving both of the rollers at once transversely both to the direction of movement toward and away from central parts of the disks and to the direction of movement from one disk to the other and means for moving either roller transversely both to the direction of movement toward and away from the central parts of the disks and to the direction of movement from one disk to the other.

4. In a transmission mechanism for a motor-driven vehicle, driving wheels, two friction disks respectively in connection with the driving wheels affording between them a space, rollers for driving the friction disks, means for moving the rollers from one disk to the other and means for moving the rollers toward and away from central parts of the friction disks in connection with the means for moving the rollers from one disk to the other whereby the movement of either roller in the direction toward or away from a disk is accompanied by a corresponding movement of such roller toward or away from a central part of such disk, substantially as hereinbefore described.

5. In a transmission mechanism for a motor-driven vehicle, driving wheels, two friction disks respectively in connection with the driving wheels affording between them a tapering space, rollers to drive such friction disks, means for carrying the rollers and for moving them from one disk to the other whereby they are made to engage alternately with the one or the other disk, bell-crank levers in connection with and carried by part of the means for carrying and for moving the rollers and relatively fixed means in position to be engaged by and to move such bell-crank levers during the movement of the rollers toward and away from the disks, substantially as hereinbefore described.

6. In a transmission mechanism for a motor-driven vehicle, driving wheels, two friction disks respectively in connection with the driving wheels affording between them a tapering space, rollers for driving the friction disks, means for carrying such rollers and for moving them from one disk to the other whereby they are made to engage alternately with the one or the other disk, bell-crank levers in connection with such rollers and carried by part of the means for carrying and moving the rollers and fixed inclines for moving the bell-crank levers during the movement of the rollers toward and away from the disks, substantially as hereinbefore described.

7. In a transmission mechanism for a motor-driven vehicle, driving wheels, two friction disks respectively in connection with the driving wheels affording between them a space, rollers to drive such friction disks, means for moving the rollers from one disk to the other, means for moving the rollers toward and away from central parts of the friction disks in connection with the means for moving the rollers from one disk to the other, whereby the movement of either roller in the direction toward or away from a disk is accompanied by a corresponding movement of such roller toward or away from a central part of such disk and locking means for holding in different positions the means for moving the rollers from one disk to the other, substantially as hereinbefore described.

8. In a transmission mechanism for a motor-driven vehicle, driving wheels, two friction disks respectively in connection with the driving wheels affording between them a space, rollers to drive such friction disks, means for carrying the rollers and for moving them from one disk to the other, means for moving the rollers toward and away from central parts of the friction disks in connection with the means for carrying the rollers and for moving them from one disk to the other whereby the movement of either roller in the direction toward or away from a disk is accompanied by a corresponding movement of such roller toward or away from a central part of such disk, locking means carried by the said roller carrying and moving means and relatively fixed parts in position to be engaged by the locking means whereby the roller carrying and moving means may be locked in different positions, substantially as hereinbefore described.

9. In a transmission mechanism for a motor-driven vehicle, driving wheels, two friction disks respectively in connection with the driving wheels affording between them a space, rollers to drive such friction disks, means for carrying such rollers and for moving them from one disk to the other whereby they may be made to engage alternately with the one or the other disk, means for moving the rollers toward and away from central parts of the friction disks in connection with the means for carrying the rollers and for moving them from one disk to the other whereby the movement of either roller in the direction toward or away from a disk is accompanied by a corresponding movement of such roller toward or away from a central part of such disk, dogs carried by the roller carrying and moving means, means for moving the dogs and relatively fixed parts in position to be engaged by the dogs, whereby the roller carrying and moving means may be locked in different positions, substantially as hereinbefore described.

10. In a transmission mechanism for a motor-driven vehicle, driving wheels, two friction disks respectively in connection with the driving wheels affording between them a space, rollers to drive such friction disks, means for carrying such rollers and for moving them from one disk to the other, means for moving the rollers toward and away from central parts of the friction disks in connection with the means for carrying and moving the rollers whereby the movement of either roller in the direction toward or away from a disk is accompanied by a corresponding movement of such roller toward or away from a central part of such disk, dogs carried by the roller carrying and moving means, means for moving the dogs, and fixed guides in position to be engaged by the dogs, whereby the means for carrying and moving the rollers may be locked in different positions, substantially as hereinbefore described.

11. In a transmission mechanism for a motor-driven vehicle, driving wheels, two friction disks respectively in connection with the driving wheels affording between them a tapering space, rollers to drive such friction disks, means for carrying the rollers and for moving them from one disk to the other disk, bell-crank levers in connection with the rollers and carried by part of the means for carrying and moving the rollers, relatively fixed means in position to be engaged by and move the bell-crank levers during the movement of the rollers toward and away from the disks, locking means carried by the roller carrying and moving means, and relatively fixed parts in position to be engaged by the locking means whereby the roller carrying and moving means may be locked in different positions, substantially as hereinbefore described.

12. In a transmission mechanism for a motor-driven vehicle, driving wheels, two friction disks respectively in connection with the driving wheels affording between them a tapering space, rollers to drive such friction disks, means for carrying the rollers and for moving them from one disk to the other, bell-crank levers in connection with the rollers and carried by part of the roller carrying and moving means, relatively fixed means in position to be engaged by and move the bell-crank levers during the movement of the rollers toward and away from the disks, dogs carried by the roller carrying and moving means, means for moving the dogs and relatively fixed parts in position to be engaged by the dogs whereby the roller carrying and moving means may be locked in different positions, substantially as hereinbefore described.

13. In a transmission mechanism for a motor-driven vehicle, driving wheels, two friction disks respectively in connection with the driving wheels affording between them a tapering space, rollers to drive such friction disks, means for carrying the rollers and for moving them from one disk to the other, bell-crank levers in connection with the rollers and carried by part of the roller carrying and moving means, relatively fixed means in position to be engaged by and move the bell-crank levers during the movement of the rollers toward and away from the disks, dogs carried by the roller carrying and moving means, means for moving the dogs and fixed guides in position to be engaged by the dogs, whereby the roller carrying and moving means may be locked in different positions, substantially as hereinbefore described.

14. In a transmission mechanism for a motor-driven vehicle, driving wheels, two friction disks respectively in connection with the driving wheels affording between them a tapering space, rollers to drive such friction disks, means for carrying the rollers and for moving them from one disk to the other, dogs carried by the roller carrying and moving means, means for moving the dogs and relatively fixed parts in position to be engaged by the dogs whereby the roller carrying and moving means may be locked in different positions, substantially as hereinbefore described.

15. In a transmission mechanism for a motor-driven vehicle, driving wheels, two friction disks respectively in connection with the driving wheels affording between them a tapering space, rollers to drive such friction disks, means for carrying the rollers and for moving them from one disk to the other, dogs carried by the roller carrying and moving means, means for moving the dogs and fixed guides in position to be engaged by the dogs, whereby the roller carrying and moving means may be locked in different positions, substantially as hereinbefore described.

16. In a transmission mechanism for a motor-driven vehicle, driving wheels, two friction disks respectively in connection with the driving wheels affording between them a space tapering in a direction transverse to the axes of the disks, rollers to drive such friction disks, means for moving the rollers toward and away from central parts of the disks, means for carrying the rollers and for moving them from one disk to the other, means for moving both of the rollers at once transversely both to the direction of movement toward and away from central parts of the disks and to the direction of movement from one disk to the other, and locking means for holding in different positions the roller carrying and moving means and connected with said means for moving both the rollers transversely at once, and relatively fixed parts in position to be engaged by the locking means whereby the means for moving transversely both of the rollers at once will cause them to be disengaged from the disks as said locking means are disengaged, substantially as hereinbefore described.

17. In a transmission mechanism for a motor-driven vehicle, driving wheels, two friction disks respectively in connection with the driving wheels affording between them a space tapering in a direction transverse to the axes of the disks, rollers to drive the friction disks, means for moving the rollers toward and away from central parts of the disks, means for carrying the rollers and for moving them from one disk to the other, means for moving both of the rollers at once transversely both to the directions of movement toward and away from central parts of the disks and to the direction of movement from one disk to the other, dogs for holding in different positions the roller carrying and moving means and connected with said means for moving transversely both of the rollers at once and relatively fixed parts in position to be engaged by the dogs, whereby the means for so moving transversely both of the rollers at once will cause them to be disengaged from the disks as said dogs are disengaged, substantially as hereinbefore described.

18. In a transmission mechanism for a motor-driven vehicle, driving wheels, two friction disks respectively in connection with the driving wheels affording between them a space tapering in a direction transverse to the axes of the disks, rollers to drive such friction disks, means for moving the rollers toward and away from central parts of the disks, means for carrying the rollers and for moving them from one disk to the other, means for moving both of the rollers at once transversely both to the direction of movement toward and away from central parts of the disks and to the direction of movement from one disk to the other, dogs for holding in different positions the roller carrying and moving means and connected with said means for moving transversely both of the rollers at once and fixed guides in position to be engaged by the dogs, whereby the means for so moving transversely both of the rollers at once will cause them to be disengaged as said dogs are disengaged from said fixed guides, substantially as hereinbefore described.

19. In a transmission mechanism for a motor driven vehicle, driving wheels, two friction disks respectively in connection with the driving wheels affording between them a space tapering in a direction transverse to the axes of the disks, rollers to drive such friction disks, an axial support for the rollers, a frame movable to bring either roller alternately against either friction disk and provided with guides for the said axial support, means for moving the axial support in the guides about either of two parts and means of moving the axial support as a whole in such guides transversely both to the axes of the rollers and to the direction of movement toward and away from central parts of the disks and to the direction of movement from one disk to the other, whereby one or other or both rollers may be disengaged and reëngaged, substantially as hereinbefore described.

20. In a transmission mechanism for a motor-driven vehicle, driving wheels, two friction disks respectively in connection with the driving wheels affording between them a space tapering in a direction transverse to the axes of the disks, rollers to drive such friction disks, an axial support for such rollers, a frame movable to bring either roller alternately against either friction disk and provided with guides for the said axial support, springs in the frame arranged to press the said axial support in the direction of the guides, means of moving the axial support in such guides about either of two parts and means of moving the axial support as a whole in such guides transversely both to the axes of the rollers and to the direction of movement toward and away from central parts of the disks and to the direction of movement from one disk to the other, whereby one or other or both rollers may be disengaged and reëngaged, substantially as hereinbefore described.

21. In a transmission mechanism for a motor-driven vehicle, driving wheels, two friction disks respectively in connection with the driving wheels and canted to afford between them a space tapering in a direction transverse to the axes of the disks, and rollers to drive such friction disks and movable toward and away from central parts of the disks and from one disk to the other and further movable separately or both at once transversely both to the direction of movement toward and away from the central parts of the disks and to the movement from one disk to the other, substantially as hereinbefore described.

22. In a transmission mechanism for a motor-driven vehicle, driving wheels, two conoidal friction disks respectively in connection with the driving wheels and affording between them a space tapering in a direction transvers to the axes of the disks, and rollers to drive such friction disks and movable toward and away from central parts of the disks and from one disk to the other and further movable separately or both at once transversely both to the direction of movement toward and away from the centarl parts of the disks and to the movement from one disk to the other, substantially as hereinbefore described.

23. In a transmission mechanism for a motor-driven vehicle, driving wheels, two conoidal friction disks respectively in connection with the driving wheels and canted relatively to one another, affording between them a space tapering in a direction transverse to the axes of the disks, and rollers to drive such friction disks and movable toward and away from central parts thereof and from one disk to the other and further movable separately or both at once transversely both to the direction of movement toward and away from the central parts of the disks and to the movement from one disk to the other, substantially as hereinbefore described.

In testimony, that I claim the foregoing as my invention, I have signed my name in presence of two witnesses, this tenth day of March, 1909.

THOMAS FRANCIS EVANS.

Witnesses:
HOWARD CHELTHAM,
RUTH M. WILSON.